United States Patent
Lanahan et al.

(10) Patent No.: US 9,613,006 B2
(45) Date of Patent: *Apr. 4, 2017

(54) SYSTEM AND METHODS FOR AUTOMATIC MEDIA POPULATION OF A STYLE PRESENTATION

(71) Applicant: eBay Inc., San Jose, CA (US)

(72) Inventors: James W. Lanahan, San Jose, CA (US); Dane M. Howard, San Jose, CA (US); Brian F. Williams, San Jose, CA (US); Luke Peacock, San Jose, CA (US); Belmer Perrella Garcia Negrillo, San Jose, CA (US)

(73) Assignee: EBAY, INC., San Jose, CA (US)

( * ) Notice: Subject to any disclaimer, the term of this patent is extended or adjusted under 35 U.S.C. 154(b) by 376 days.

This patent is subject to a terminal disclaimer.

(21) Appl. No.: 14/149,140

(22) Filed: Jan. 7, 2014

(65) Prior Publication Data

US 2014/0122985 A1 May 1, 2014

Related U.S. Application Data

(63) Continuation of application No. 12/347,749, filed on Dec. 31, 2008, now Pat. No. 8,627,192.

(60) Provisional application No. 61/078,288, filed on Jul. 3, 2008.

(51) Int. Cl.
G06F 17/00 (2006.01)
G06F 17/24 (2006.01)
G06F 17/21 (2006.01)
G06F 17/30 (2006.01)
G06T 11/60 (2006.01)
G06F 3/0482 (2013.01)
G06F 3/048 (2013.01)

(52) U.S. Cl.
CPC .......... *G06F 17/211* (2013.01); *G06F 3/0482* (2013.01); *G06F 17/241* (2013.01); *G06F 17/30684* (2013.01); *G06T 11/60* (2013.01)

(58) Field of Classification Search
CPC .............. G06F 17/30038; G06F 3/048; G06F 17/30056
See application file for complete search history.

(56) References Cited

U.S. PATENT DOCUMENTS 5,666,554 A * 9/1997 Tanaka ...................... G06T 1/00
707/999.003
7,752,548 B2 * 7/2010 Mercer ................. G11B 27/031
715/202
7,768,535 B2 * 8/2010 Reid ................. G06F 17/30265
345/660

(Continued)

OTHER PUBLICATIONS

Formatting Shapes and Objects, www.functionx.com/powerpoint/Lesson11.htm, Dec. 14, 2007 pp. 1-8.*

*Primary Examiner* — Scott Baderman
*Assistant Examiner* — Mario M Velez-Lopez (57) ABSTRACT

A method for automatic media population of a style presentation comprises collecting presentation media; positioning the collected presentation media on a storyboard; and selecting a style presentation; wherein the selection of the style presentation results in the automatic population of the style presentation with the presentation media positioned on the storyboard is described herein.

20 Claims, 10 Drawing Sheets

(56) References Cited

U.S. PATENT DOCUMENTS

| | | | | |
|---|---|---|---|---|
| 8,024,658 B1* | 9/2011 | Fagans | G06Q 30/0621 | 715/243 |
| 8,365,092 B2* | 1/2013 | Lanahan | G06T 11/60 | 345/635 |
| 2002/0152233 A1* | 10/2002 | Cheong | G06F 17/30017 | 715/202 |
| 2004/0268224 A1* | 12/2004 | Balkus | G06F 17/30056 | 715/203 |
| 2005/0114754 A1* | 5/2005 | Miller | G11B 27/034 | 715/201 |
| 2005/0114784 A1* | 5/2005 | Spring | G06F 17/30056 | 715/762 |
| 2005/0268279 A1* | 12/2005 | Paulsen | G06F 8/38 | 717/110 |
| 2005/0273693 A1* | 12/2005 | Peterson | G06F 17/21 | 715/202 |
| 2006/0069989 A1* | 3/2006 | Jones | G06F 17/24 | 715/273 |
| 2006/0129917 A1* | 6/2006 | Volk | G06F 17/2247 | 715/201 |
| 2006/0181736 A1* | 8/2006 | Quek | G03D 15/005 | 358/1.18 |
| 2006/0230332 A1* | 10/2006 | Lin | G09B 5/06 | 715/203 |
| 2007/0016930 A1* | 1/2007 | Wesemann | H04H 60/04 | 725/46 |
| 2007/0033059 A1* | 2/2007 | Adkins | G06Q 10/067 | 705/1.1 |
| 2007/0050718 A1* | 3/2007 | Moore | G06F 3/0482 | 715/744 |
| 2007/0061715 A1* | 3/2007 | Chartier | G06F 3/04845 | 715/204 |
| 2007/0074110 A1* | 3/2007 | Miksovsky | G06T 11/60 | 715/210 |
| 2007/0118801 A1* | 5/2007 | Harshbarger | G11B 27/031 | 715/730 |
| 2007/0162853 A1* | 7/2007 | Weber | G06F 3/0482 | 715/719 |
| 2008/0195477 A1* | 8/2008 | Kennedy | G06Q 30/02 | 705/14.54 |
| 2008/0222560 A1* | 9/2008 | Harrison | G06F 3/04847 | 715/800 |
| 2008/0270905 A1* | 10/2008 | Goldman | G06F 9/4446 | 715/721 |
| 2009/0177546 A1* | 7/2009 | Dijk | G06Q 30/02 | 705/14.52 |
| 2010/0023849 A1* | 1/2010 | Hakim | H04L 12/6418 | 715/202 |
| 2010/0281386 A1* | 11/2010 | Lyons | G06F 3/048 | 715/731 |
| 2011/0060979 A1* | 3/2011 | O'Brien-Strain | G09G 5/14 | 715/204 |
| 2011/0285748 A1* | 11/2011 | Slatter | G06T 11/60 | 345/629 |

\* cited by examiner

SYSTEM AND METHODS FOR AUTOMATIC MEDIA POPULATION OF A STYLE PRESENTATION

CROSS-REFERENCE TO RELATED APPLICATIONS

This application is a continuation of U.S. patent application Ser. No. 12/347,749, filed Dec. 21, 2008, which claims priority and the benefit of U.S. Provisional Patent Application Ser. No. 61/078,288, filed Jul. 3, 2008, entitled, "Multi-Media Online Presentation System and Method," the entire disclosures of which are incorporated herein by reference.

BACKGROUND

Field of Invention

The present invention generally relates to network-based multimedia presentations and more particularly to a system and methods for automatic media population of a style presentation.

Related Art

Multimedia is media and content that utilizes a combination of different content forms. The term is used in contrast to media that only utilizes traditional forms of printed or hand-produced text and still graphics. In general, multimedia includes a combination of text, audio, still images, animation, video, and interactivity content forms. Multimedia is usually recorded and played, displayed, or accessed by information content processing devices, such as computerized and electronic devices. Multimedia finds its application in various areas including, but not limited to, social marketing, advertisement, art, education, entertainment, engineering, medicine, mathematics, business, scientific research and spatial temporal applications.

A variety of online websites are presently available to enable the creation and presentation including the publication of some form of multimedia. For example, MixerCast enables a user to build a social marketing application from scratch. Scrapblog enables a user to combine photos, videos, audio and text to create multimedia scrapbooks. Smilebox facilitates "creative messaging" that draws elements from photo services, scrapbooking, and e-cards.

Each website will typically provide one or more online tools for the creation and customization of the multimedia. Such online tools and/or desktop tools such as Photoshop, Illustrator, etc., allow the user to collect, edit, create, and publish or distribute the multimedia. In this regard, various style presentations may be utilized, photos may be resized and text may be added, video may be inserted, and/or links to other sites or presentations may be provided. Despite providing some level of customization, multimedia tools currently available are often cumbersome and difficult to use and thus limit the self-expression and creativity of the non-professional user when creating multimedia presentations. Accordingly, there exists a need for a relatively more robust multimedia creation tool including a system and method for the automatic media population of a style presentation.

SUMMARY

For purposes of summarizing the disclosure, exemplary embodiments of systems and methods for automatic media population of a style presentation have been described herein.

In one embodiment, a method for automatic media population of a style presentation, comprises: collecting presentation media; positioning the collected presentation media on a storyboard; and selecting a style presentation; wherein the selection of the style presentation results in the automatic population of the style presentation with the presentation media positioned on the storyboard.

In another embodiment, a system for automatic media population of a style presentation, comprises a storage device; a processing element having a processing program and access to the storage device; and a process-readable medium having executable instructions thereon to direct the processing system when used by the processing element to: collect presentation media; position the collected presentation media on a storyboard; and select a style presentation; wherein the selection of the style presentation results in the automatic population of the style presentation with the presentation media positioned on the storyboard.

In still another embodiment, a computer-readable medium having computer executable instructions for performing a method comprises collecting presentation media; positioning the collected presentation media on a storyboard; and selecting a style presentation; wherein the selection of the style presentation results in the automatic population of the style presentation with the presentation media positioned on the storyboard.

These and other features and advantages of the present invention will be more readily apparent from the detailed description of the embodiments set forth below taken in conjunction with the accompanying drawings.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure related to systems and methods for the automatic media population of a style presentation. As indicated above, multimedia presentations may find application in various areas including, but not limited to, social marketing, advertisement, art, education, entertainment, engineering, medicine, mathematics, business, scientific research and spatial temporal applications.

Figure 1:
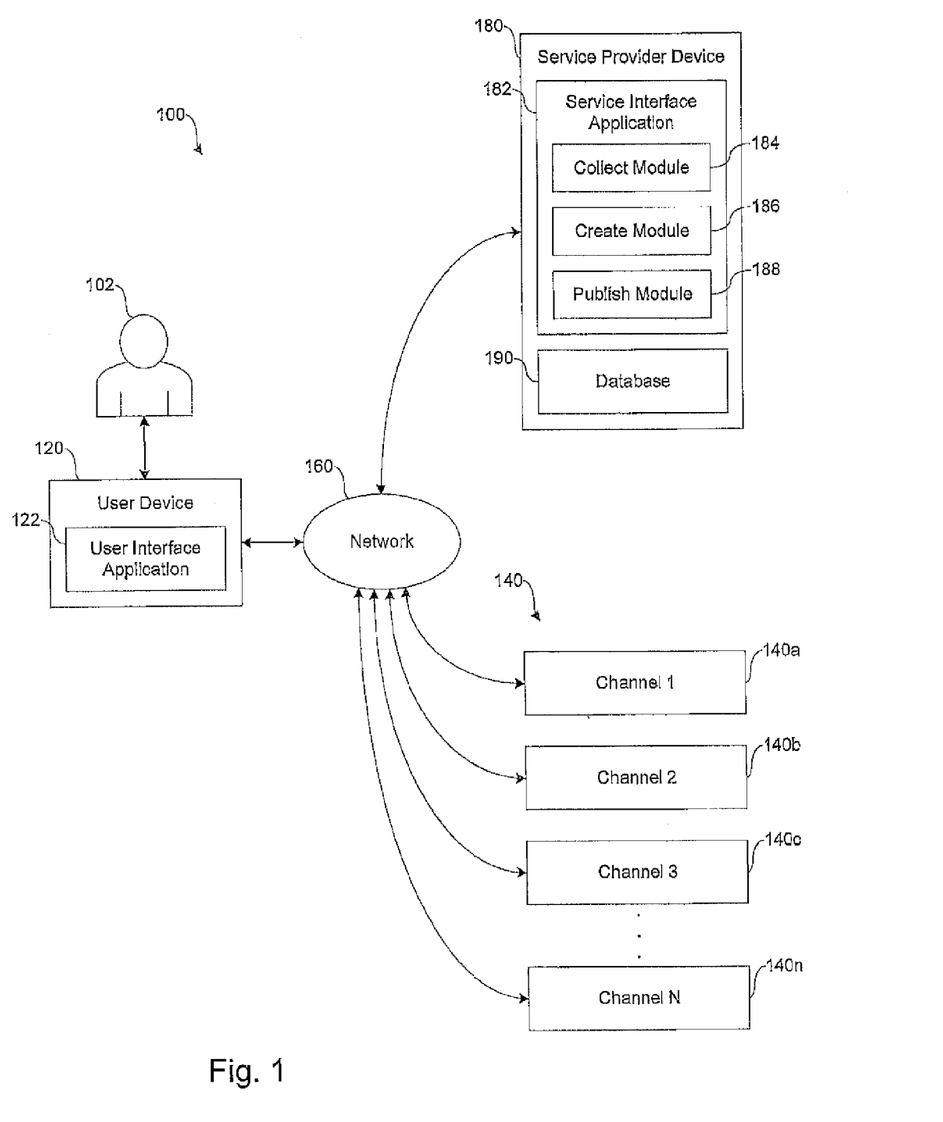
FIG. 1 shows a block diagram of a system configured to facilitate the creation and publishing and/or sharing of multimedia presentations over a network.

In one embodiment a system and method provides for a robust end-to-end digital media creation architecture that enables a user to create rich multi-media presentations and clips online with real-time editing and authoring, and then share or publish the media online. As shown in FIG. 1, the system 100 includes at least one client device 120 (e.g., network computing device), one or more multi-media distribution channels 140 (e.g., network server devices), and at least one service provider device 180 (e.g., network server device) in communication over the network 160.

In one embodiment, the network 160 may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the at least one client device 120, the multi-media distribution channels 140, and the at least one service provider device 180 may be associated with a particular link (e.g., a link, such as a URL (Uniform Resource Locator) to an IP (Internet Protocol) address).

In various embodiments, the at least one client device 120 may be implemented using any appropriate combination of hardware and/or software configured for wired and/or wireless communication over the network 160. The client device 120 may be implemented as a personal computing device (e.g., a personal computer (PC)) in communication with the network 160, such as the Internet. In various other implementations, the client device 120 may be implemented as one or more wireless telephones (e.g., cell phones), personal digital assistants (PDAs), notebook computers, and/or various other generally known types of wired and/or wireless computing devices. It should be appreciated that the client device 120 may be referred to as a user device or customer device without departing from the scope of the present disclosure.

In one embodiment, the client device 120 includes a user interface application 122 that may be utilized by a user 102 to conduct information transactions with the distribution channels 140 and the service provider server 180 over the network 160. For example, the user interface application 122 may be implemented as a multi-media presentation application to collect, create and publish information via the network 160. In various implementations, multi-media presentations may be published to and/or shared with one or more of the multi-media channels 140 via the user interface application 122 over the network 160.

In one implementation, the user interface application 122 comprises a software program, such as a graphical user interface (GUI), executable by a processor that is configured to interface and communicate with the multi-media channels 140 and the service provider server 180 via the network 160. In another implementation, the user interface application 122 comprises a browser module that provides a network interface to browse information available over the network 160. For example, the user interface application 122 may be implemented, in part, as a web browser to view information available over the network 160. In another example, each member of the user group 102 is able to access multi-media websites via the one or more multi-media channels 140 to view, collect and publish multi-media presentations over the network 160.

In various embodiments, the client device 120 may include other applications as may be desired in one or more implementations to provide additional features available to the user 102. In one example, such other applications may include security applications for implementing client-side security features, programmatic client applications for interfacing with appropriate application programming interfaces (APIs) over the network 160 or various other types of generally known programs and/or applications. In other examples, these other applications may interface with the user interface application 122 for improved efficiency and convenience. For example, files, data, and/or various types of information may be imported from multi-media software directly into the user interface application 122 for ease of access to multi-media files (e.g., audio, video, pictures, clip-art, etc.).

The client device 120 may include a user identifier, which may be implemented, for example, as operating system registry entries, cookies associated with the user interface application 122, identifiers associated with hardware of the client device 120, or various other appropriate identifiers. The user identifier may include attributes related to the user 102, such as personal information (e.g., a user name, password, etc.). In one implementation, the user identifier may be passed to the service provider server 180 during publishing and/or sharing of a multi-media presentation.

In one embodiment, the multi-media distribution channels 140 may be maintained by one or more resource providers and/or entities (e.g., social networking sites, resource information sites, management sites, merchant sites, etc.) in communication with the network 160. In this regard, the service provider server 180, discussed below, may maintain or provide access to the one or more of the multi-media distribution channels. The multi-media distribution channels 140 may be implemented using any appropriate combination of hardware and/or software configured for wired and/or wireless communication over the network 160. In one implementation, the multi-media distribution channels 140 may be implemented as a network computing device (e.g., a network server) in wired and/or wireless communication with the network 160.

In one embodiment, the service provider server 180 may be maintained by an online transaction processing provider and/or entity in communication with the network 160. As such, the service provider server 180 may be implemented using any appropriate combination of hardware and/or software configured for wired and/or wireless communication over the network 160. In one implementation, the service provider server 180 may be implemented as a network computing device (e.g., a network server) in wired and/or wireless communication with the network 160.

As further shown in FIG. 1, the service provider server 180 includes a service interface application 182, which may be adapted to interact with the client device 120 to facilitate the collection of media, as well as the creation including editing and the publishing and/or sharing of multimedia presentations over a network. In one example, the service provider server 180 may be provided and implemented by PayPal, Inc. of San Jose, Calif., USA.

The service application 182, in one embodiment, utilizes a collect module 184, a create module 186, and a publish module 188 running on a standard web browser to collect information, create presentations, and publish presentations, respectively. As described in greater detail herein, the modules 184, 186, 188 enable users, such as the user 102, to collect diverse types of audio and visual media, create rich multi-media presentations with real-time editing and authoring using media software, such as Flash, and then share and/or publish the rich multi-media presentations with other users via the network 160. In one example, the collect, create, and publish modules 184, 186, 188 may be implemented within a standard web browser for interfacing with the user 102.

In one implementation, the user 102 is able to share multi-media presentations with other users via the media channels 140 and/or embed multi-media presentations directly in webpages of other users. For example, the user 102 may provide a unique URL link for the multi-media presentation to other users. In another example, the user 102 may directly email multi-media presentations to multiple recipients and include a message with the email. In still another example, the user 102 may provide the source HTML (i.e., HyperText Markup Language) code to other users and/or embed the source HTML code directly into another user's webpage. Still other examples include the ability to publish multi-media presentations on a website to sell a particular item or service for purchase. For items and/or services, a media rich presentation may help users market and sell items and/or services, which may be valuable for high-end or high-priced items and/or services. Social and/or dating sites may utilize these multi-media presentations to provide online users with a way to better present themselves to other online users. In various implementations, some type of webpage may be presented in a more dynamic manner by utilizing Rich Site Summary (RSS) feeds, since, for example, a particular user's presentation may be continually changing with new media.

In various embodiments, the service provider server 180 may be configured to maintain, store and/or archive multi-media presentations in a database 190, each of which may include information related to one or more users, such as the user 102, and one or more multimedia channels, such as multimedia distributions channels 140. In various examples, the multimedia presentations may include attributes stored as part thereof, and the attributes may be passed to the service provider server 180 as part of a creating, publishing and/or sharing the multi-media presentations.

Referring to FIG. 1, in one embodiment, the collect module 184 enables the user 102 to collect audio, photographic images, video, and music media from various sources, such as a PC, KSS feeds, websites, and any other online source, via a user interface, such as the user interface application 122. In various implementations, the user interface application 122 comprises multiple tabs and/or links for the various sources. Key words can be selected to search photos in Flicks or videos in YouTube. For example, typing in "flamingo" and selecting Flickr results in pictures of flamingos or photos matching the word "flamingo" from Flickr being presented on the user's GUI or media page. The user can then drag and drop desired pictures onto a storyboard on that same screen. The pictures can be edited into stacks if desired. For videos, a desired video can be placed onto the user's media page by typing in the corresponding URL in YouTube. The system can then display the complete as well as a series of shorter video clips. The whole video or selected shorter clips, as well as the photos can then be dragged and dropped into a storybook section to create a presentation from the media collected.

Once collected, the media may be saved and categorized in the database 190 and edited on the system site via the service provider server 180. Editing may include one or more of sizing, rotating, overlying, moving and stacking various media backward and forward with an overlay or stack. Video may be broken up automatically by the service provider server 180 into smaller segments. Selected video segments may be combined and/or used as desired. Selected media may be placed on a virtual storyboard, such as a clipboard, on the same screen as the collection of media. Media may be edited either in the collection or in the storyboard. Placing desired media on the storyboard or clip board may be accomplished by dragging and dropping. In one example, the collect module 184 provides selected media on a storyboard. In another example, the collect module 184 provides media on a user's media page (i.e., not placed on the storyboard). In still another example, uploading media may be delayed until editing is completed.

In one embodiment, the create module 186 enables the user 102 to place selected media onto a storyboard. The service provider server 180 may automatically suggest a story idea to launch the creative process, or the user 102 may select a specific style or presentation tool. Within the presentation, there may be multiple styles, such as a picture frame, a television, a billboard, etc. In one implementation, media from the storyboard may be dragged and dropped onto the presentation. In this regard, media may be placed within the viewing window of each type of style.

Alternatively, as shown in FIGS. 2A-2H, the user can create a presentation from the media in the storybook section by selecting a style, such as a slide show, a photo slider, a room with different viewing areas including picture frames, etc. The media is then automatically loaded into the selected style. For example, a clustered set of photos may automatically play in frame, and a video clip may automatically play on a television. In another example, the branches of a tree are automatically filled with different selected media for viewing. Another style may be a page of postcards, such that when that style is selected, the previously chosen media is automatically filled into the postcards on a single page.

Figure 2A:
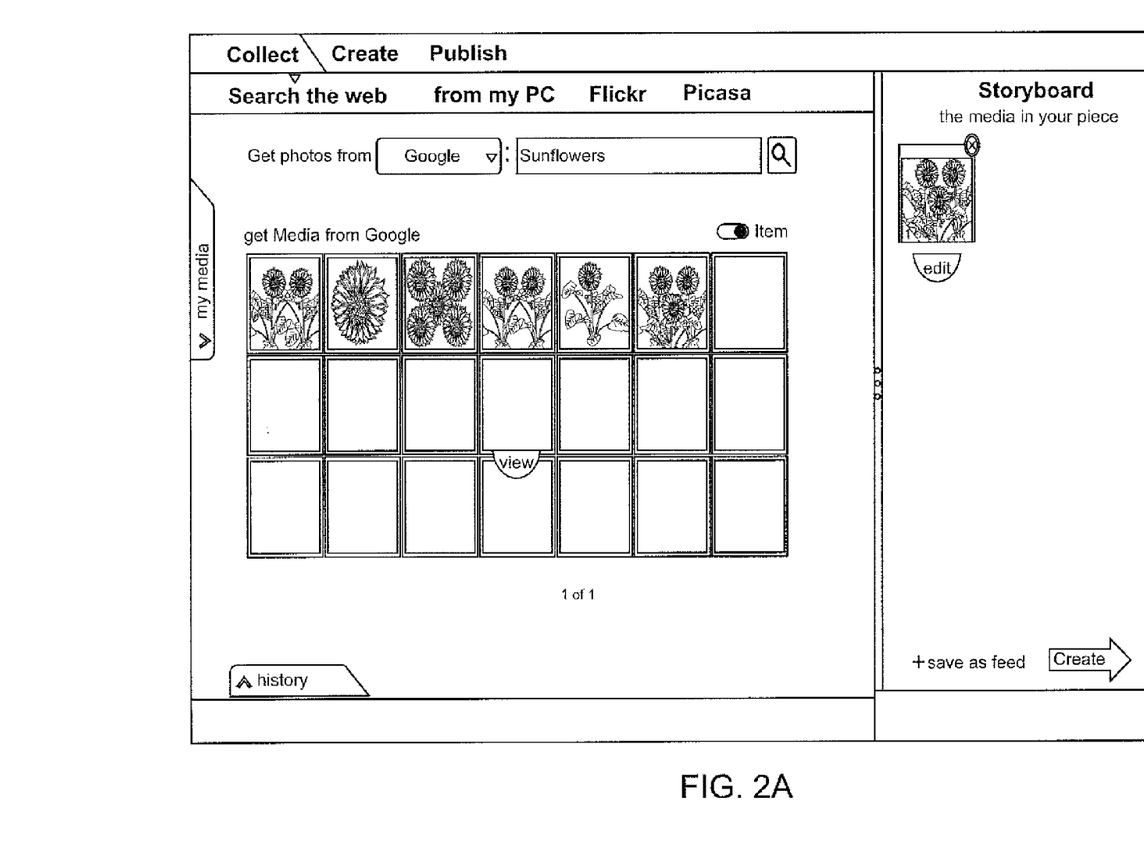
FIGS. 2A-2H show elements, components, or stages for the automatic media population of a style presentation in accordance with one embodiment.
Figure 2B:
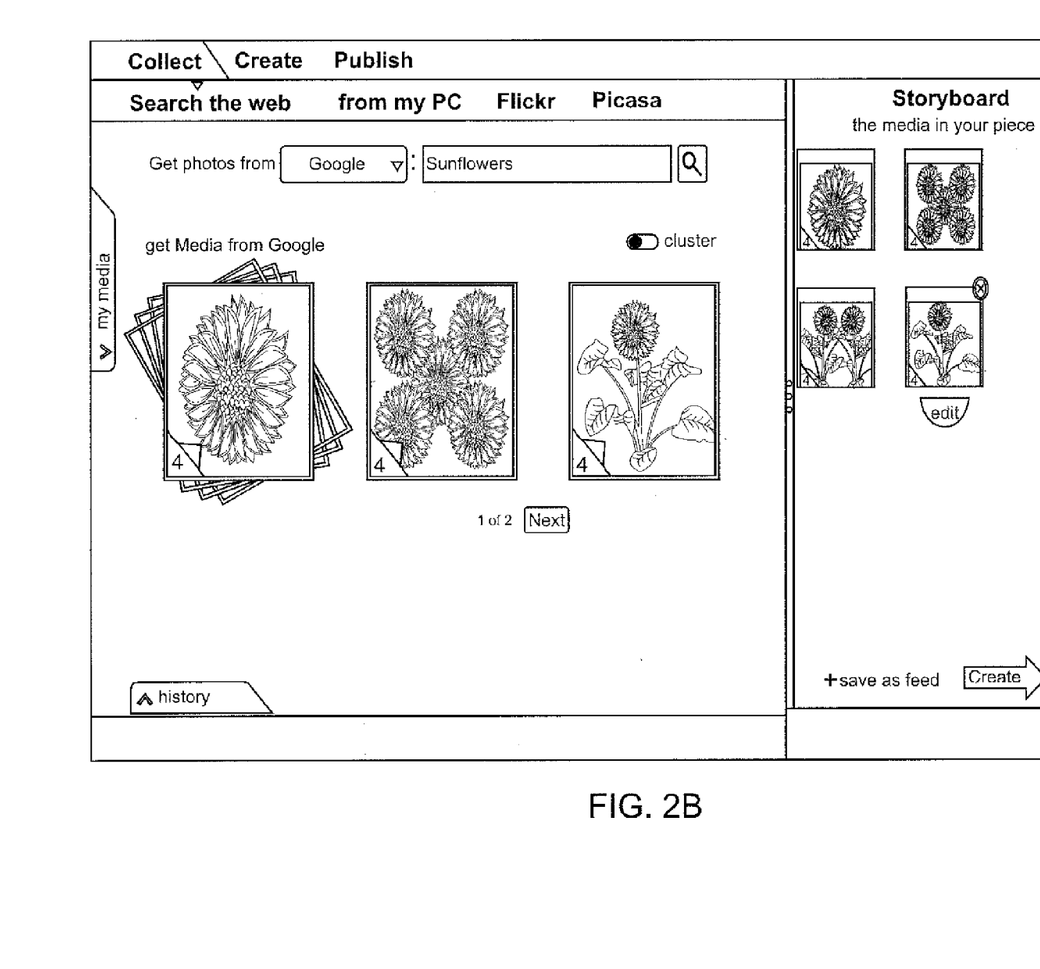
Figure 2C:
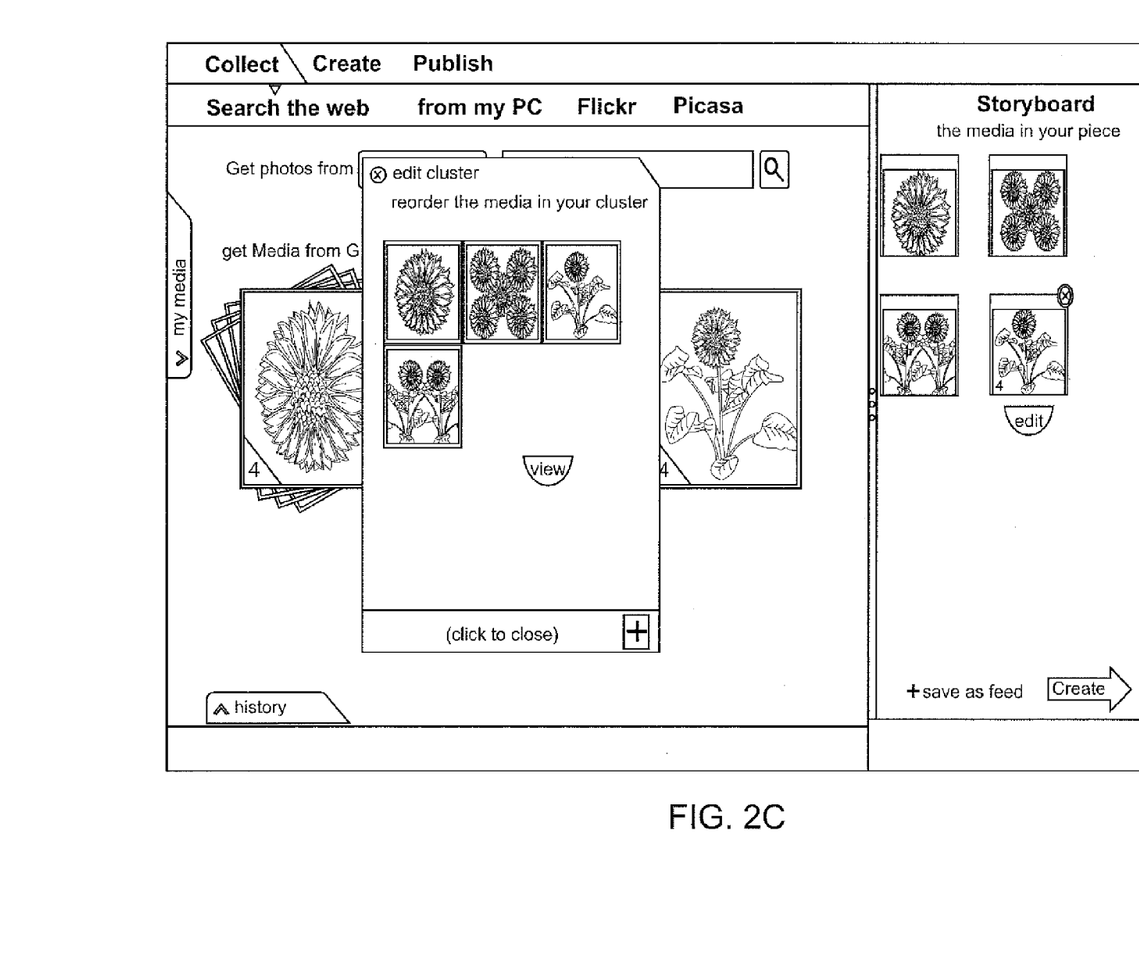
Figure 2D:
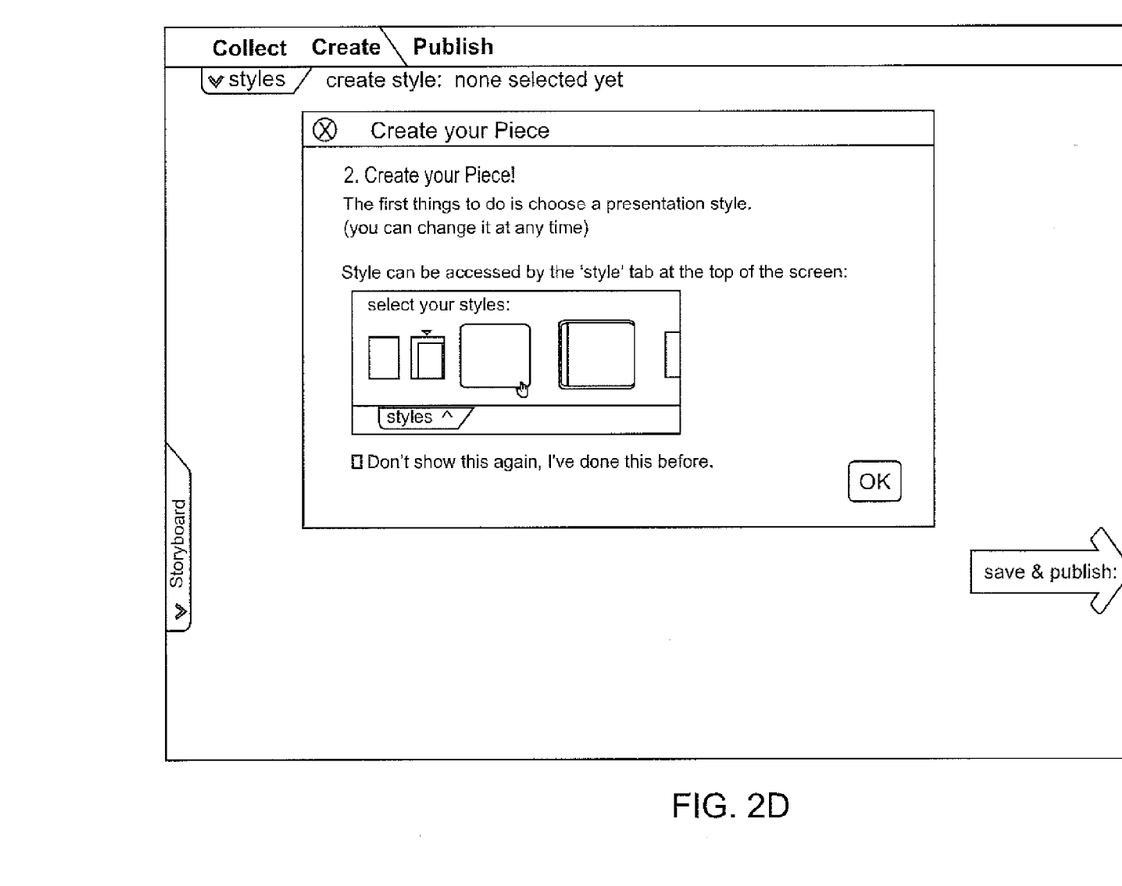

More specifically, in one embodiment, once media is collected, a storyboard located on the right side of the user interface may be populated with the collected media by dragging and dropping one or more of the media items or cluster of media items collected from the various media sources from the media collection area onto the storyboard for later use in creating a media piece (FIG. 2A). In this regard, the storyboard may includes two items collected from the web, one item uploaded from a PC, and a cluster of four items also collected from the web (FIG. 2B). Media positioned on the storyboard may be edited prior to creating a media piece. For example, individual items of media in a media cluster may be reordered (FIG. 2C). Once media has been collected and edited, media piece creation may proceed by clicking the create arrow at the bottom of the user interface and then choosing to proceed to the create module 186 (FIG. 2D).

Figure 2E:
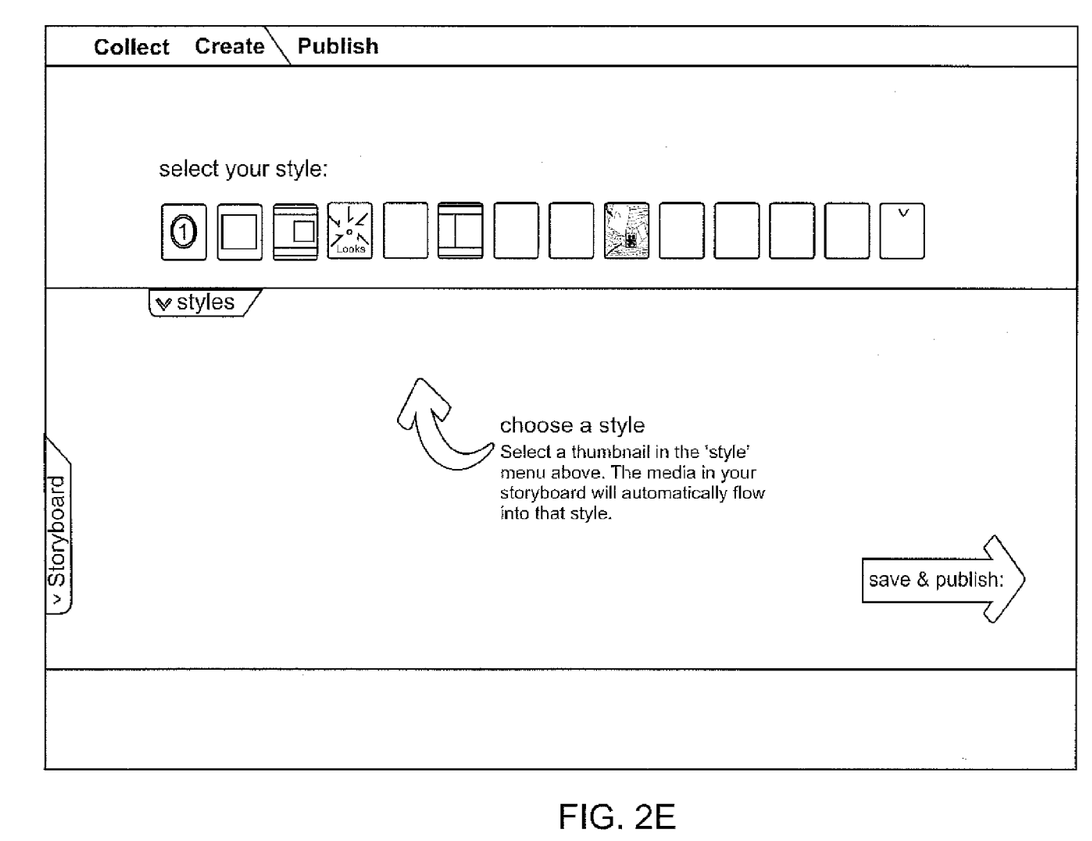
Figure 2F:
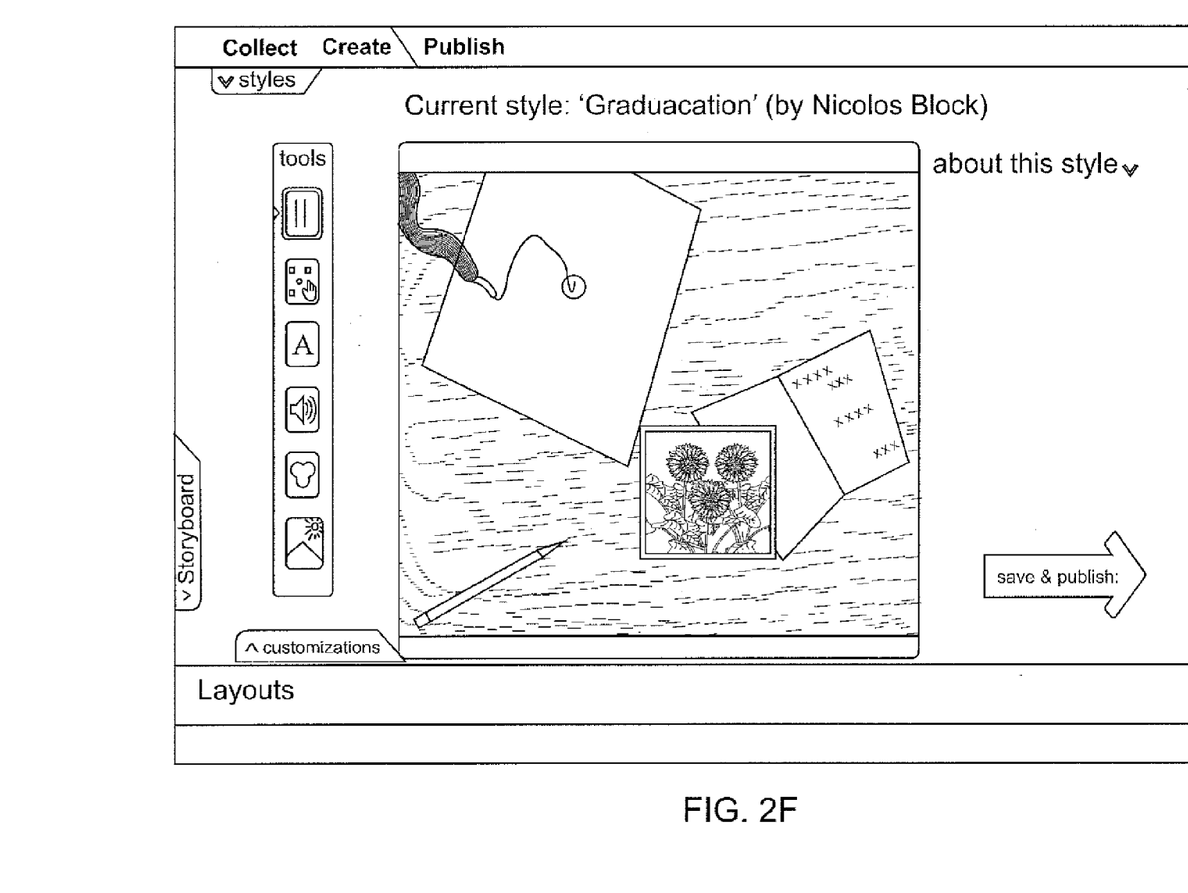
Figure 2G:
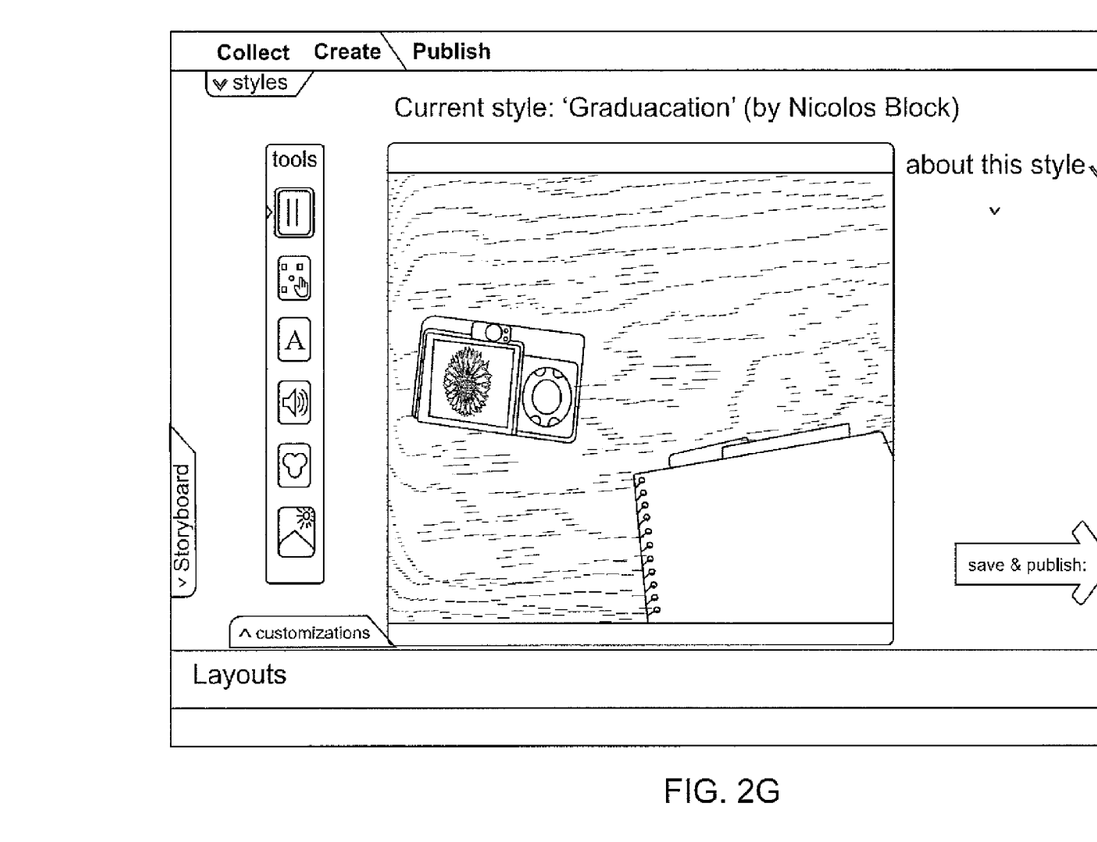
Figure 2H:
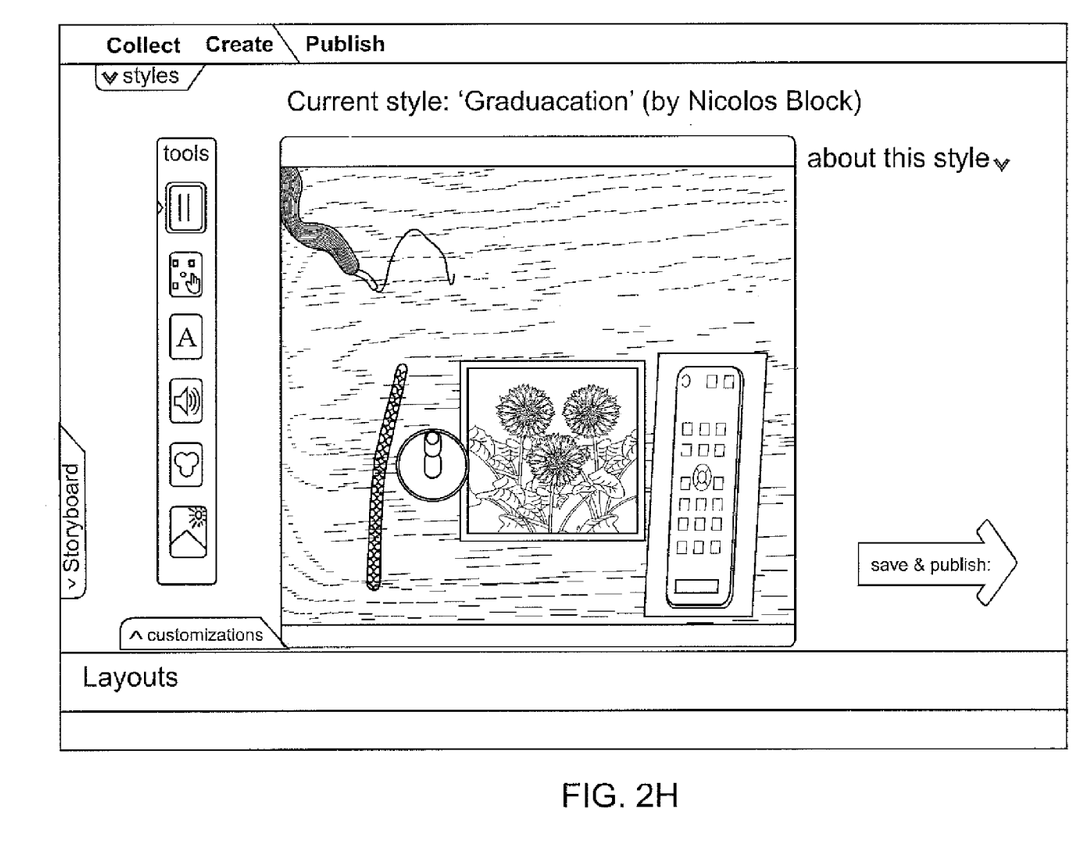

As indicated above, to begin the process of creating a media piece the user may select a thumbnail from the presentation "styles" menu (FIG. 2E). Presentation styles may include, but are not limited to, a picture frame, billboard, kaleidoscope, street scene, landscape, etc. Once a "style" is selected media from the storyboard will automatically flow into or populate the chosen "style" (FIGS. 2F, 2G, and 2H). In this regard, the presentation media shown in FIG. 2B has automatically populated corresponding presentation elements with the chosen presentation style. Some styles, which support movement of media as part of a presentation style, may provide the user with the ability to customize various characteristics of the movement such as speed of media rotation, etc., within the style.

Once the style is chosen, the user may also select different variations of the style. Each particular style typically has a different set of variations suited for that style. For example, for the tree style, a user may select different types of frames on the branches to contain the media, a specific background may be selected from a user image, and different style trees may be used. For the photo slider, different types and styles of frames may be used, as well as different types of presentations, e.g., spacing between photos, no spacing, and background selection. For the page of postcards, the user may select different configurations of the postcards on the page as well as different backgrounds for the page.

Once in the style presentation, the media may be edited. For example, the media may be rotated, sized, cut-out (e.g., by selecting the boundaries of an image, such as with clicks to designate points along the boundary, enabling as coarse or fine a resolution as desired), moved forward or backward in relation to adjacent media, slide multiple images to add or remove spaces within the presentation, and adding a hotspot (e.g., selecting an area of the image for additional information, such as adding a link, video, text, etc.). Other editing features may include adding audio to the background, adding text, and/or distorting images. This further editing may depend on the style chosen, as different styles may have different editing capabilities. In one aspect, the editing may be achieved in real-time so that the user 102 may quickly and easily see the results and change them as needed.

Various tools or modules may be combined, used, and/or modified to provide the user with different initial choices regarding the type of presentation and features desired for creating the multimedia presentation. For example, as described blow, the user may access a collage tool or application to create dynamic interactive panoramas with "hot spots" and layouts of photos, video, text and audio on an infinite stage. In one variation of collage the stage extends infinitely to the right, and when viewed there is a natural progression from left to right that can map well to linear narrative, time, or space. In another variation the stage extends infinity downward. Again, this presents a natural mapping to time, space, or narrative. The collage tool introduces a new creation platform for WYSIWYG online multimedia layout and sharing, offering the ability to include direct links and presentations.

In one embodiment, the publish module 186 enables the user 102 to share, publish and/or distribute the presentation when, for example, the presentation is completed. In one implementation, as described herein, the presentation may be saved in the database 190 of the service provider server 180. Once saved, the user 102 may share, publish and/or distribute presentations to any selected channel, such as one or more of the multi-media channels 140. Any users on the network 160 having access to the channels 140 or website related to the channels 140 may refresh the view, which may automatically load the presentation into that channel and/or website for viewing the content of the presentation. As such, the presentations may be distributed to various online websites, blogs, mobile video players, and IP TV networks, and/or on the system site.

The collect, create, and publish modules 184, 186, 188 may be combined, used, and/or modified to provide the user 102 with different initial choices regarding the type of presentation and features desired for creating the multimedia presentation. The choices may be a simple, easy to use tool to quickly build presentations with dynamic content from RSS feeds and online albums. Accordingly, the user 102 may select a presentation style and then link it to the user's media libraries through RSS feeds that maintain an "always on" permalink to the content source.

Figure 3:
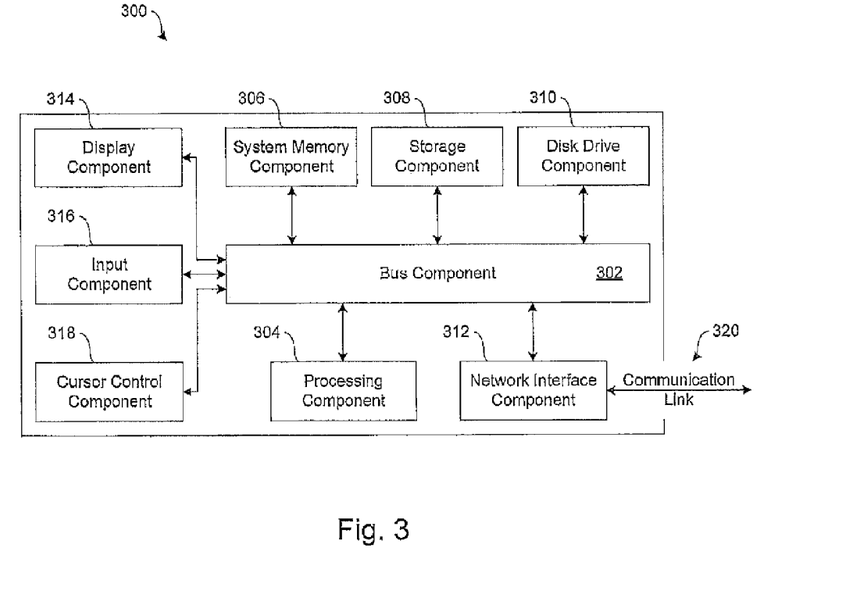
FIG. 3 is a block diagram of a computer system suitable for implementing one or more embodiments of the present disclosure.

FIG. 3 is a block diagram of a computer system 300 suitable for implementing one or more embodiments of the present disclosure, including the user device 120, the one or more distribution channels 140, and the service provider device 180. In various implementations, the client device 140 may comprise a personal computing device capable of communicating with the network 160, such as a personal computer, laptop, cell phone, PDA, etc., the one or more merchant devices 140 may comprise a network computing device, such as a network server, and the service provider device 180 may comprise a network computing device, such as a network server. Hence, it should be appreciated that each of the devices 120, 140, 180 may be implemented as computer system 300 in a manner as follows.

In accordance with various embodiments of the present disclosure, computer system 300, such as a personal computer and/or a network server, includes a bus 302 or other communication mechanism for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., CRT or LCD), input component 316 (e.g., keyboard), and cursor control component 318 (e.g., mouse or trackball). In one implementation, disk drive component 310 may comprise a database having one or more disk drive components.

In accordance with embodiments of the present disclosure, methods described herein are developed as a program language and embodied in a processing of computer-readable medium as executable instructions that can be used to direct a processing program when used by the computer system 300. In this regard, the computer system 300 may perform specific operations by processor 304 executing one or more sequences of one or more instructions contained in system memory component 306. Such instructions may be read into system memory component 306 from a computer readable medium, such as static storage component 308 or disk drive component 310. In other embodiments, hardwired circuitry may be used in place of or in combination with software instructions to implement the present disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, non-volatile media includes optical or magnetic disks, such as disk drive component 310, volatile media includes dynamic memory, such as system memory component 306, and transmission media includes coaxial cables, copper wire, and fiber optics, including wires that comprise bus 302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 320 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims

What is claimed is:

1. A method comprising:
   collecting at least one media element having at least one data type having at least one format;
   arranging the at least one media element in a media collection without user input; and
   selecting, using one or more hardware processors, a presentation for the at least one media element, wherein the presentation comprises at least one presentation element having a corresponding data type and format, wherein the selection of the presentation results in automatic population of the at least one presentation element of the presentation with one of the at least one media element arranged in the media collection having the corresponding data type and format for each of the at least one media element, wherein the one of the at least one media element is identified without further user input by searching the media collection to find the one of the at least one media element that is accepted by the at least one presentation element.

2. The method of claim 1, wherein the automatic population of the at least one presentation element occurs when the presentation is selected.

3. The method of claim 1, wherein the at least one media element comprises a video element.

4. The method of claim 1, wherein the at least one media element comprises an audio element.

5. The method of claim 1, wherein the at least one media element comprises an image element.

6. The method of claim 1, the at least one media element comprises dynamic content linked to a content source.

7. The method of claim 1 further comprising:
   editing the at least one media element within the presentation.

8. The method of claim 1 further comprising:
   sharing the presentation populated with the at least one media element with at least one other user.

9. The method of claim 1 further comprising:
   selecting a plurality of presentations having a different number of presentation elements accepting different corresponding data types and formats, wherein the selection of one of the presentations results in the automatic population of the different number of presentation elements with the at least one media element having at least one of the corresponding data types and formats to the different corresponding data types and formats.

10. The method of claim 1 further comprising:
    selecting a variation of the at least one presentation element within the presentation.

11. A system comprising:
    a non-transitory memory storing presentation information comprising a presentation for at least one media element;
    one or more hardware processors configured to execute instruction to cause the system to perform operation comprising:
        collect the at least one media element having at least one data type having at least one format;
        arrange the at least one media element in a media collection without user input; and
        select the presentation for the at least one media element, wherein the presentation comprises at least one presentation element having a corresponding data type and format,
            wherein the selection of the presentation results in automatic population of the at least one presentation element of the presentation with one of the at least one media elements arranged in the media collection having the corresponding data type and format for each of the at least one media element, wherein the one of the at least one media element is identified without further user input by searching the media collection to find the one of the at least one media element that is accepted by the at least one presentation element.

12. The system of claim 11, wherein the automatic population of the at least one presentation element occurs when the presentation is selected.

13. The system of claim 11, wherein the at least one media element comprises one of a video element, an audio element, an image element, and dynamic content linked to a content source.

14. The system of claim 11, wherein the one or more hardware processor is further configured to:
    edit the at least one media element within the presentation.

15. The system of claim 11, wherein the one or more hardware processor is further configured to:

share the presentation populated with the at least one media element with at least one other user.

16. The system of claim 11, wherein the one or more hardware processor is further configured to:
   select a plurality of presentations having a different number of presentation elements accepting different corresponding data types and formats, wherein the selection of one of the presentations results in the automatic population of the different number of presentation elements with the at least one media element having at least one of the corresponding data types and formats to the different corresponding data types and formats.

17. The system of claim 11, wherein the one or more hardware processor is further configured to:
   select a variation of the at least one presentation element within the presentation.

18. A non-transitory machine-readable medium having stored thereon machine-readable instructions executable to cause a machine to perform operations comprising:
   collecting at least one media element having at least one data type having at least one format;
   arranging the at least one media element in a media collection without user input; and
   selecting a presentation for the at least one media element, wherein the presentation comprises at least one presentation element having a corresponding data type and format,
   wherein the selection of the presentation results in automatic population of the at least one presentation element of the presentation with one of the at least one media element arranged in the media collection having the corresponding data type and format for each of the at least one media element, wherein the one of the at least one media element is identified without further user input by searching the media collection to find the one of the at least one media element that is accepted by the at least one presentation element.

19. The non-transitory machine-readable medium of claim 18, wherein the at least one media element comprises one of a video element, an audio element, an image element, and dynamic content linked to a content source.

20. The non-transitory computer readable medium of claim 18, wherein the method further comprises:
   sharing the presentation populated with the at least one media element with at least one other user.

* * * * *

UNITED STATES PATENT AND TRADEMARK OFFICE
CERTIFICATE OF CORRECTION

PATENT NO. : 9,613,006 B2
APPLICATION NO. : 14/149140
DATED : April 4, 2017
INVENTOR(S) : James W. Lanahan et al.

It is certified that error appears in the above-identified patent and that said Letters Patent is hereby corrected as shown below:

In the Specification

In Column 1, Line 9, delete "Dec. 21," and insert -- Dec. 31, --, therefor.

In the Claims

In Column 12, Line 20, in Claim 20, delete "computer readable" and insert -- machine-readable --, therefor.

Signed and Sealed this
Sixth Day of August, 2019

Andrei Iancu
*Director of the United States Patent and Trademark Office*